US007440730B2

(12) United States Patent
Aloni-Lavi et al.

(10) Patent No.: US 7,440,730 B2
(45) Date of Patent: Oct. 21, 2008

(54) DEVICE, SYSTEM AND METHOD OF MULTIPLE TRANSCEIVERS CONTROL

(75) Inventors: Ruth Aloni-Lavi, Raanana (IL); Shimeon Greenberg, Yavne (IL); Eliav Zipper, Tel Aviv (IL)

(73) Assignee: Intel Corporation, Santa Clara (*) Notice: Subject to any disclaimer, the term of this patent is extended or adjusted under 35 U.S.C. 154(b) by 393 days.

(21) Appl. No.: 11/170,108

(22) Filed: Jun. 30, 2005

(65) Prior Publication Data

US 2007/0004336 A1 Jan. 4, 2007

(51) Int. Cl.
*H04B 17/00* (2006.01)
(52) U.S. Cl. ............... 455/63.1; 455/67.13; 455/88; 455/62; 455/434; 455/464; 455/296; 370/338; 370/341; 370/329
(58) Field of Classification Search ............. 455/63.1, 455/574, 67.13, 62, 434, 464, 296, 13.4, 455/426.1
See application file for complete search history.

(56) References Cited

U.S. PATENT DOCUMENTS

| 5,103,295 | A | * | 4/1992 | Uwabata et al. ............ 348/556 |
| 5,283,653 | A | * | 2/1994 | Citta ...................... 348/725 |
| 5,551,057 | A | * | 8/1996 | Mitra ...................... 455/522 |
| 5,818,530 | A | * | 10/1998 | Canfield et al. .......... 348/400.1 |
| 5,825,424 | A | * | 10/1998 | Canfield et al. ......... 375/240.15 |
| 6,018,661 | A | * | 1/2000 | Raith et al. ............... 455/437 |
| 6,067,123 | A | * | 5/2000 | Lee ......................... 348/554 |
| 6,069,871 | A | * | 5/2000 | Sharma et al. ............. 370/209 |
| 6,144,646 | A | * | 11/2000 | Bohlmann et al. .......... 370/311 |
| 6,204,884 | B1 | * | 3/2001 | Lee ......................... 348/555 |
| 6,330,344 | B1 | * | 12/2001 | Kondo et al. .............. 382/107 |
| 6,356,531 | B1 | * | 3/2002 | Soliman .................... 370/241 |
| 6,516,184 | B1 | * | 2/2003 | Damgaard et al. ........... 455/86 |
| 6,729,929 | B1 | * | 5/2004 | Sayers et al. .............. 455/446 |
| 6,882,635 | B2 | * | 4/2005 | Eitan et al. ................ 370/338 |
| 6,914,893 | B2 | * | 7/2005 | Petite ...................... 370/338 |
| 6,987,539 | B2 | * | 1/2006 | Kondo et al. .............. 348/441 |
| 7,031,711 | B2 | * | 4/2006 | Soliman .................... 455/438 |
| 7,035,676 | B2 | * | 4/2006 | Ranta ...................... 455/574 |
| 7,068,987 | B2 | * | 6/2006 | Baldwin et al. ........... 455/232.1 |
| 7,092,716 | B2 | * | 8/2006 | Nizri et al. ................ 455/448 |
| 7,116,988 | B2 | * | 10/2006 | Dietrich et al. ........... 455/456.1 |
| 7,177,596 | B2 | * | 2/2007 | Chen et al. ................ 455/41.2 |
| 7,221,955 | B2 | * | 5/2007 | Chen et al. ................ 455/522 |

(Continued)

OTHER PUBLICATIONS

Tasic et al., "Design of Multistandard Adaptive Voltage-Controlled Oscillators", IEEE Transactions on Microwave Theory and Techniques, vol. 53, No. 2, Feb. 2005, pp. 556-563.

(Continued)

*Primary Examiner*—Marceau Milord
(74) *Attorney, Agent, or Firm*—Pearl Cohen Zedek Latzer, LLP

(57) ABSTRACT

Briefly, some embodiments of the invention provide devices, systems and methods of multiple transceivers control. For example, a method in accordance with an embodiment of the invention may include determining whether interference is expected between an intended activity of a first wireless transceiver of a wireless communication station and an activity of a second wireless transceiver of said wireless communication station; and based on the determination result, modifying an operational parameter of an interference reducer of said wireless communication station.

20 Claims, 3 Drawing Sheets

U.S. PATENT DOCUMENTS 7,227,907 B2 * 6/2007 Proctor et al. .............. 375/296
7,277,420 B2 * 10/2007 Chou et al. ................ 370/350
7,330,697 B1 * 2/2008 Bolt et al. .................. 455/63.1

OTHER PUBLICATIONS

IEEE P802.15.2/Draft#07, Telecommunications and Information exchange between systems—Local and metropolitan area networks Specific Requirements—Part 15.2: Coexistence of Wireless Personal Area Networks with Other Wireless Devices Operating in Unlicensed Frquency Bands, IEEE Computer Society Sponsored by the LAN/MAN Standards Commitee, pp. 1-130, Dec. 20, 2002.

* cited by examiner

US 7,440,730 B2

DEVICE, SYSTEM AND METHOD OF MULTIPLE TRANSCEIVERS CONTROL

BACKGROUND OF THE INVENTION

In the field of wireless communications, a first wireless communication station may include multiple transceivers able to communicate, for example, with a second wireless communication station, a wireless access point, or a wireless servicing station or base station. For example, a first transceiver of the first wireless communication station may send and receive wireless signals in accordance with a first wireless communication standard or protocol, e.g., Institute of Electrical and Electronics Engineers (IEEE) 802.11 standard; whereas a second transceiver of the wireless communication station may send and receive wireless signals in accordance with a second, different wireless communication standard or protocol, e.g., IEEE 802.16 standard.

The first wireless transceiver may interfere with the second wireless transceiver, e.g., due to possible phase noise, crosstalk, ElectroMagnetic Interference (EMI), or the like. Such interference may be reduced using an active component, e.g., a Voltage Controlled Oscillator (VCO), or a passive component, e.g., a filter, which may produce a cleaner signal. Unfortunately, the active component may consume significant power, whereas the passive component may reduce the signal quality and the transceiver's sensitivity.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
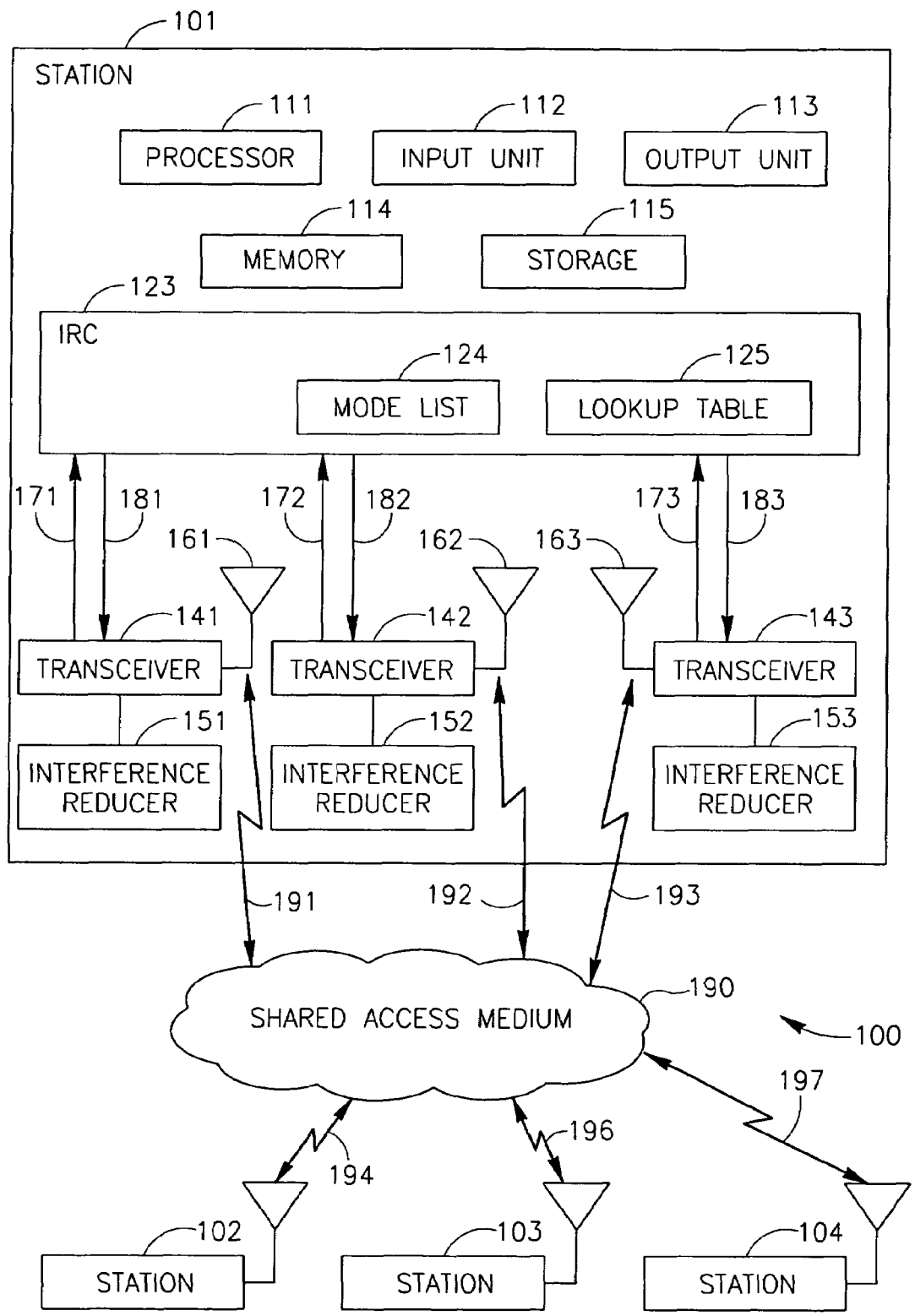
FIG. 1 is a schematic block diagram illustration of a wireless communication system including a wireless communication station having multiple transceivers to communicate in multiple communication protocols, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with many apparatuses and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a hand-held device, a tablet computer, a server computer, a network, a wireless network, a Local Area Network (LAN), a Wireless LAN (WLAN), devices and/or networks operating in accordance with existing IEEE 802.11, 802.11a, 802.11b, 802.11e, 802.11g, 802.11 h, 802.11i, 802.11n, 802.16 standards and/or future versions of the above standards, a Wi-Fi device, a Wi-MAX device, a BlueTooth device, a ZigBee device, a Wide Area Network (WAN) device or system, a Personal Area Network (PAN), a Wireless PAN (WPAN), units and/or devices which are part of the above WLAN and/or PAN and/or WPAN networks, one way and/or two-way radio communication devices or systems, cellular radio-telephone communication devices or systems, a cellular telephone, a mobile phone, a wireless telephone, a Personal Communication Systems (PCS) device, a PDA device incorporating a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. It is noted that embodiments of the invention may be used in various other apparatuses, devices, systems and/or networks.

FIG. 1 schematically illustrates a block diagram of a wireless communication system 100 including a wireless communication station 101 having multiple transceivers to communicate in multiple communication protocols in accordance with an embodiment of the invention. System 100 may include one or more wireless communication stations, e.g., stations 101, 102, 103 and 104. System 100 may optionally include one or more other wireless communication devices, for example, a wireless access point, a wireless base station, a wireless servicing station, or the like. In one embodiment, for example, stations 101-104 may communicate using a shared access medium 190, for example, through wireless communication links.

Station 101 may include, for example, a processor 111, an input unit 112, an output unit 113, a memory unit 114, and a storage unit 115. Station 101 may further include, for example, an Interference Reduction Controller (IRC) 123 and multiple transceivers, e.g., transceivers 141, 142 and 143, as described in detail below. Station 101 may further include other hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Input unit 112 may include, for example, a keyboard, a keypad, a mouse, a touch-pad, a pointing device, a microphone, a voice-recognition unit, or other suitable input device. Output unit 113 may include, for example, a Cathode Ray Tube (CRT) monitor or display unit, a Liquid Crystal Display (LCD) monitor or display unit, a plasma monitor or display unit, other types of monitors or display units, a speaker, an ear-phone, or other suitable output devices.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Storage unit 115 may include, for example, a hard disk drive, a floppy disk drive, a Compact Disk (CD) drive, a CD-ROM drive, or other suitable removable or non-removable storage units.

In some embodiments, optionally, an application 170 may be executed by one or more components of station 101, for example, by processor 111. The application 170 may include, for example, a software application, an Operating System (OS), a communications driver, or the like, and may be stored in memory unit 114 and/or storage unit 115.

Transceiver 141, transceiver 142 and transceiver 143 may include, for example, a wireless transmitter/receiver able to send and receive Radio Frequency (RF) signals, e.g., through antennas 161, 162 and 163, respectively. Although three transceivers 141-143 and three antennas 161-163 are shown, embodiments of the invention may include, and may be used in association with, other numbers of transceivers and/or antennas.

In some embodiments, the functionality of transceivers 141, 142 and 143 may be implemented in the form of a transmitter and a receiver, or other one or more units able to perform separate or integrated functions of sending and/or receiving wireless communication signals, blocks, frames, transmission streams, packets, messages and/or data.

Antenna 161, antenna 162 and/or antenna 163 may include an internal and/or external RF antenna, for example, a dipole antenna, a monopole antenna, an omni-directional antenna, an end fed antenna, a circularly polarized antenna, a microstrip antenna, a diversity antenna, a "smart" antenna, or any other type of antenna suitable for sending and/or receiving wireless communication signals, blocks, frames, transmission streams, packets, messages and/or data.

Transceivers 141, 142 and/or 143 may be able to operate in accordance with one or more wireless communication standards or protocols, for example, Institute of Electrical and Electronics Engineers (IEEE) 802.11, 802.11a, 802.11b, 802.11e, 802.11g, 802.11 h, 802.11i, 802.11n, 802.16 standards, Wi-Fi, Wi-MAX, BlueTooth, ZigBee, a mobile phone or cellular phone wireless communication standard or protocol, a WAN communication standard or protocol, the like.

In some embodiments, for example, transceivers 141-143 may use wireless communication links 191-193, respectively, to communicate through shared access medium 190; and stations 102, 103 and. 104 may use wireless communication links 194, 196 and 197, respectively, to communicate through shared access medium 190.

In one embodiment, for example, transceiver 141 and station 102 may be able to operate and/or communicate in accordance with 802.11 standard, and may communicate using wireless links 191 and 194, respectively; transceiver 142 and station 103 may be able to operate and/or communicate in accordance with 802.16 standard, and may communicate using wireless links 192 and 196, respectively; and transceiver 144 and station 104 may be able to operate and/or communicate in accordance with BlueTooth standard, and may communicate using wireless links 193 and 197, respectively.

Transceiver 141 may include, or may be operatively associated with, an interference reducer 151 able to reduce the noise of a wireless signal generated by transceiver 141 or able to otherwise reduce interference between two wireless communication signals. The interference reducer 151 may include, for example, an active component, e.g., an adaptive bias Voltage Controlled Oscillator (VCO), and/or a passive component, e.g., a filter. Additionally or alternatively, transceiver 142 may include, or may be operatively associated with, an interference reducer 152, and transceiver 143 may include, or may be operatively associated with, an interference reducer 153. In one embodiment, interference reducers 151, 152 and/or 153 may be an integral part or component of transceivers 141, 142 and/or 143, respectively, for example, a Low-Noise Amplifier (LNA) having changeable bias, a Power Amplifier (PA) having changeable bias, a mixer having changeable bias, or the like. In another embodiment, interference reducers 151, 152 and/or 153 may be a dedicated component operatively associated with transceivers 141, 142 and/or 143, respectively.

Interference reducers 151, 152 and/or 153 may have multiple operational modes. In one embodiment, for example, interference reducers 151, 152 and/or 153 may be in an active mode in which the interference reducer is operational, or a non-active mode in which the interference reducer is substantially non operational. In another embodiment, for example, interference reducers 151, 152 and/or 153 may have various operational modes, e.g., controllable by an adaptive bias VCO or other active component responsive to a supplied power level, as described below.

In accordance with some embodiments of the invention, prior to transmitting or receiving data, transceiver 141 may send a signal to IRC 123 indicating a property of the intended transmission or reception, e.g., an indication of a transmission or reception mode, or an indication that the intended transmission or reception is in accordance with a pre-defined standard or protocol; the uplink signal may be referred to herein as "transmission/reception mode indication" or "activity mode indication". For example, transceiver 141 may send to IRC 123 a first signal over an uplink 171, indicating that transceiver 141 is about to transmit or receive in accordance with the 802.11 standard.

IRC 123 may store, e.g., in a mode list 124, the transmission/reception mode indication received from transceiver 141. The mode list 124 may be implemented, for example, as part of IRC 123 or memory unit 114, and may be substantially empty upon activation of station 101. If no other transmission/reception mode indications, e.g., originating from transceivers 142 and/or 143, are already stored in memory unit 114, then IRC 123 may send to transceiver 141 a signal over a downlink 181., indicating that transceiver 141 need not activate the interference reducer 151; the downlink signal may be referred to herein as "mode selection signal". Transceiver 141 may receive the mode selection signal, and in response may deactivate interference reducer 151, and may transmit in accordance with the 802.11 standard.

Then, prior to transmitting or receiving data by transceiver 142, transceiver 142 may send to IRC 123 a transmission/reception mode indication over an uplink 172, e.g., indicating that transceiver 142 is about to transmit or receive in accordance with 802.16 standard. IRC 123 may store, e.g., in mode list 124, the transmission/reception mode indication received from transceiver 142. IRC 123 may check if the transmission or reception intended by transceiver 142 may interfere with concurrent transmissions or receptions of transceiver 141 and/or transceiver 143, e.g., based on prior transmission/reception mode indications. For example, IRC 123 may determine that memory unit 114 stores a prior transmission/reception mode indication, indicating that transceiver 141 transmits or receives in accordance with the 802.11 standard.

Then, IRC 123 may determine whether there is possible interference between, for example, the signal transmitted or received using the transmission/reception mode of transceiver 141 and the signal intended for transmission or reception using the transmission/reception mode of transceiver 142. Based on the determination results, IRC 123 may send one or more mode selection signals to transceivers 141 and/or 142, e.g., indicating a requirement or instruction to activate, deactivate and/or modify an operational parameter of one or more interference reducers.

For example, in one embodiment, IRC 123 may determine that no interference is expected if transceiver 142 transmits or receives wireless signals in accordance with the 802.16 standard while transceiver 141 transmits or receives wireless signals in accordance with the 802.11 standard. In such case, IRC 123 may send to transceiver 142 a mode selection signal over a downlink 182, indicating that transceiver 142 need not activate the interference reducer 152. Transceiver 142 may receive the mode selection signal, and in response may deactivate the interference reducer 152, and may transmit in accordance with the 802.16 standard without noise reduction.

Conversely, IRC 123 may determine that interference is expected if transceiver 142 transmits or receives wireless signals in accordance with the 802.16 standard while transceiver 141 transmits or receives wireless signals in accordance with the 802.11 standard. In such case, IRC 123 may send to transceiver 142 a mode selection signal over downlink 182, indicating that transceiver 142 is required or instructed to activate the interference reducer 152. Additionally or alternatively, IRC 123 may send to transceiver 141 a mode selection signal over downlink 181, indicating that transceiver 141 is required or instructed to activate the interference reducer 151.

Similarly, prior to transmitting or receiving data by transceiver 143, transceiver 143 may send to IRC 123 a transmission/reception mode indication over an uplink 173. IRC 123 may check for possible interference, and may send to transceiver 143 a mode selection signal over a downlink 183, e.g., indicating a requirement or instruction to activate, deactivate and/or modify an operational parameter of interference reducer 153.

In some embodiments, IRC 123 may check for possible interference between signals of the different transmission/reception modes based on a pre-defined algorithm, table, lookup table, list, or the like. In one embodiment, for example, IRC 123 may include, e.g., in a lookup table 125, pre-defined or pre-stored data indicating that transmission or reception of wireless signals using a first standard or protocol is expected to interfere with transmission or reception of wireless signals using a second standard or protocol, and hence may require activation of one or more interference reducers, or may require a certain setting of an operational parameter of one of more interference reducers. Additionally or alternatively, IRC 123 may include, e.g., in lookup table 125, pre-defined data indicating that transmission or reception of wireless signals using a first standard or protocol is not expected to interfere with transmission or reception of wireless signals using a third standard or protocol, and hence may not require activation of one or more interference reducers.

In some embodiments, IRC 123 may be implemented, for example, using hardware components and/or software components, e.g., able to estimate possible interference or able to determine expected interference. In some embodiments, for example, IRC 123 may be implemented as part of processor 111, as part of transceiver 141, or as a separate component of station 101 or system 100.

In some embodiments, a mode selection signal may include, for example, an indication to activate an interference reducer or noise reducer, an indication to deactivate an interference reducer or noise reducer, an indication to modify or set a property, e.g., a power or voltage level, of an interference reducer or noise reducer, an indication to bypass an interference reducer or noise reducer, or the like.

In one embodiment, IRC 123 and transceivers 141-143 may be included in station 101, and links 171-173 and 181-183 may be wired or wireless links within station 101. However, embodiments of the invention are not limited in this regard, and IRC 123 and/or transceivers 141-143 may be included in various separate devices.

In some embodiments, IRC 123 may be used to perform other and/or additional operations. In one embodiment, for example, IRC 123 may instruct a transceiver or an interference reducer to operate in a "concurrent mode", for example, by activating an interference reducer to eliminate or reduce possible interference expected due to concurrent transmission/reception of another transceiver; or to operate in a "non-concurrent mode", for example, by deactivating an interference reducer, e.g., since interference with another concurrent transmission/reception is not expected, or if there is no other concurrent transmission/reception.

Figure 2:
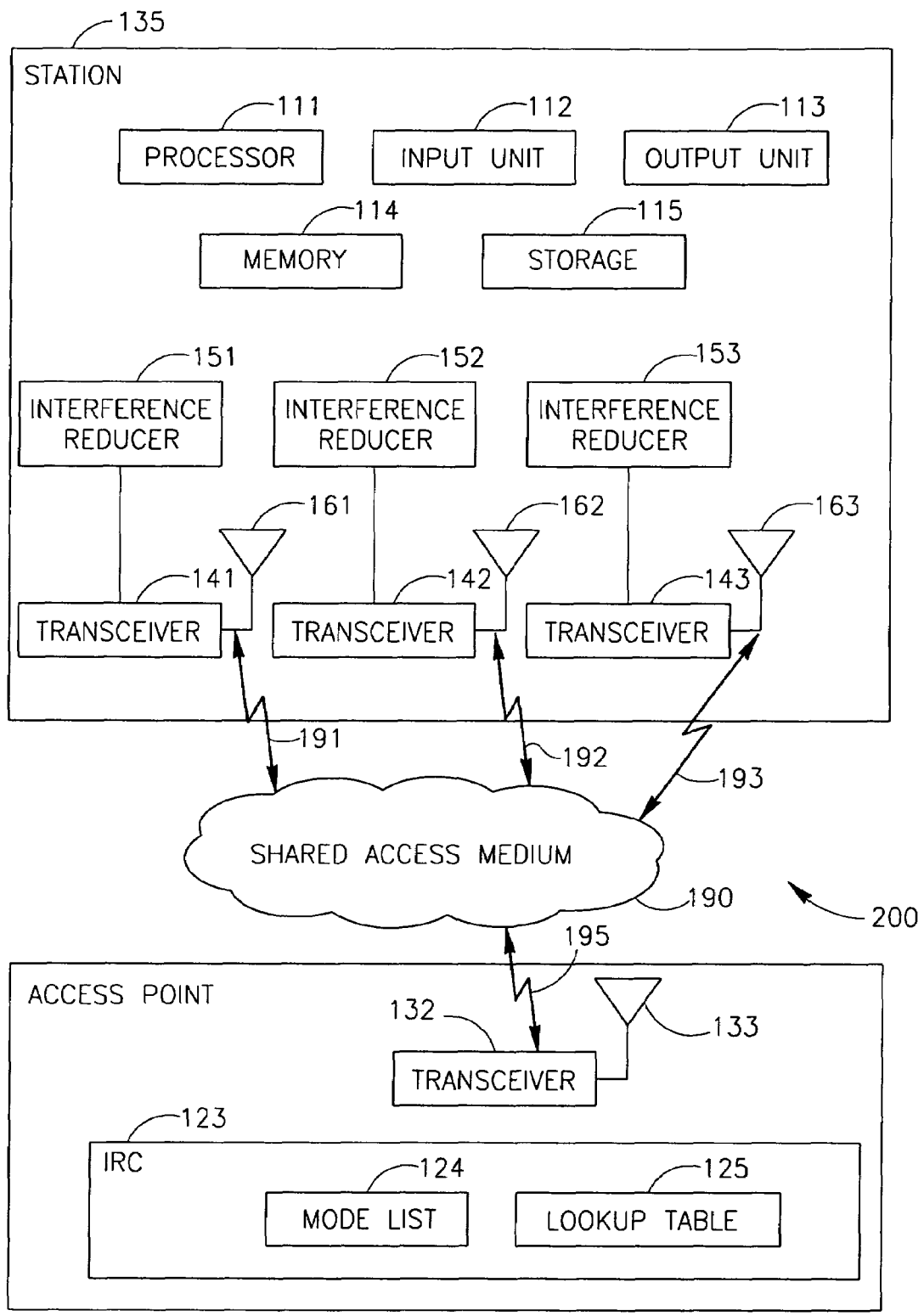
FIG. 2 is a schematic block diagram illustration of a wireless communication system including a wireless communication station having multiple transceivers to communicate in multiple communication protocols, in accordance with another embodiment of the invention.

Reference is made to FIG. 2, which schematically illustrates a block diagram of a wireless communication system 200 including wireless communication station 101 having multiple transceivers to communicate in multiple communication protocols in accordance with another embodiment of the invention. System 200 may include, for example, a wireless communication station 135 and a wireless access point 131.

Station 135 may include, for example, processor 111, input unit 112, output unit 113, memory unit 114, and storage unit 115. Station 135 may further include, for example, transceivers 141-143, antennas 161-163, and interference reducers 151-153. Transceivers 141-143 may use wireless communications links 191-193, respectively, to communicate through shared access medium 190.

Access point 131 may include, for example, a wireless transceiver 132 operatively associated with a wireless antenna 133, e.g., to transmit and/or receive wireless communication signals using a link 195 through shared access medium. Access point 131 may further include IRC 123, optionally including the mode list 124 and/or the lookup table 125. For example, IRC 123 of access point 135 may receive transmission/reception mode indications from transceivers 141-143 of station 135, may check if a possible interference is expected to exist between wireless signals, and may send mode selection signals to transceivers 141-143 of station 135, e.g., indicating a requirement or instruction to activate, deactivate and/or modify an operational parameter of one or more interference reducers 151-153 of station 135.

Other configurations may be used for devices and/or systems in accordance with embodiments of the invention. In one embodiment, for example, IRC 123 may be included in wireless access point 131, whereas transceivers 141-143 may be included in three separate wireless communication stations. In another embodiment, for example, IRC 123 may be implemented as part of one or more transceivers 141-143. Other suitable configurations may be used.

Although portions of the discussion herein may relate, for demonstrative purposes, to communication between a IRC 123 and one or more transceivers 141-143, embodiments of the invention are not limited in this regard, and may include, for example, direct communication between two or more transceivers, e.g., without requiring an IRC. For example, in one embodiment, a first transceiver may directly indicate to a second transceiver, that the first transceiver operates in accordance with a certain wireless communication standard or protocol; and based on the indication, the second transceiver may, for example, activate or deactivate an interference reducer or an interference reducer, or set or modify an operational parameter of an interference reducer or an interference reducer.

Although portions of the discussion herein may relate, for demonstrative purposes, to IRC 123 able to receive transmission/reception mode indications, embodiments of the invention are not limited in this regard, and may include, for example, an IRC able to otherwise determine, generate or receive information about activity of transceiver(s) and/or about possible or expected interference between various activities of one or more transceivers. For example, in one embodiment, the IRC may, e.g., indirectly, independently or remotely, measure existing interference or estimate possible interference; and based on the measured or estimated information, e.g., in response to a command or requirement, a transceiver may activate or deactivate an interference reducer or an interference reducer, or may set or modify an operational parameter of an interference reducer or an interference reducer.

Although portions of the discussion herein may relate, for demonstrative purposes, to reducing or eliminating interference between first and second transmitted signals, embodiments of the invention are not limited in this regard, and my include, for example, reducing or eliminating interference between first and second received signals, and/or reducing or eliminating interference between a transmitted signal and a received signal. In some embodiments, the IRC 123 may eliminate or reduce, for example, interference introduced by a transmitter to another transmitter, interference introduced by a receiver to another receiver, interference introduced by a transmitter to a receiver, and/or interference introduced by a receiver to a transmitter.

Although portions of the discussion herein may relate, for demonstrative purposes, to multiple transceivers 141-143 implemented as separate units or components, embodiments of the invention are not limited in this regard. For example, some embodiments of the invention may be used to reduce or eliminate possible interference between a transmitter and a receiver which may be optionally implemented using a single transceiver unit, or using other suitable configurations or circuits.

Although portions of the discussion herein may relate, for demonstrative purposes, to sending a transmission/reception mode indication prior to transmitting or receiving a wireless signal, embodiments of the invention are not limited in this regard, and may include, for example, sending transmission/reception mode indications at other times, and/or sending mode selection signals at other times. For example, in one embodiment, a transmission/reception mode indication may be sent periodically, or during actual transmission or reception, or immediately upon commencement of actual transmission or reception.

Figure 3:
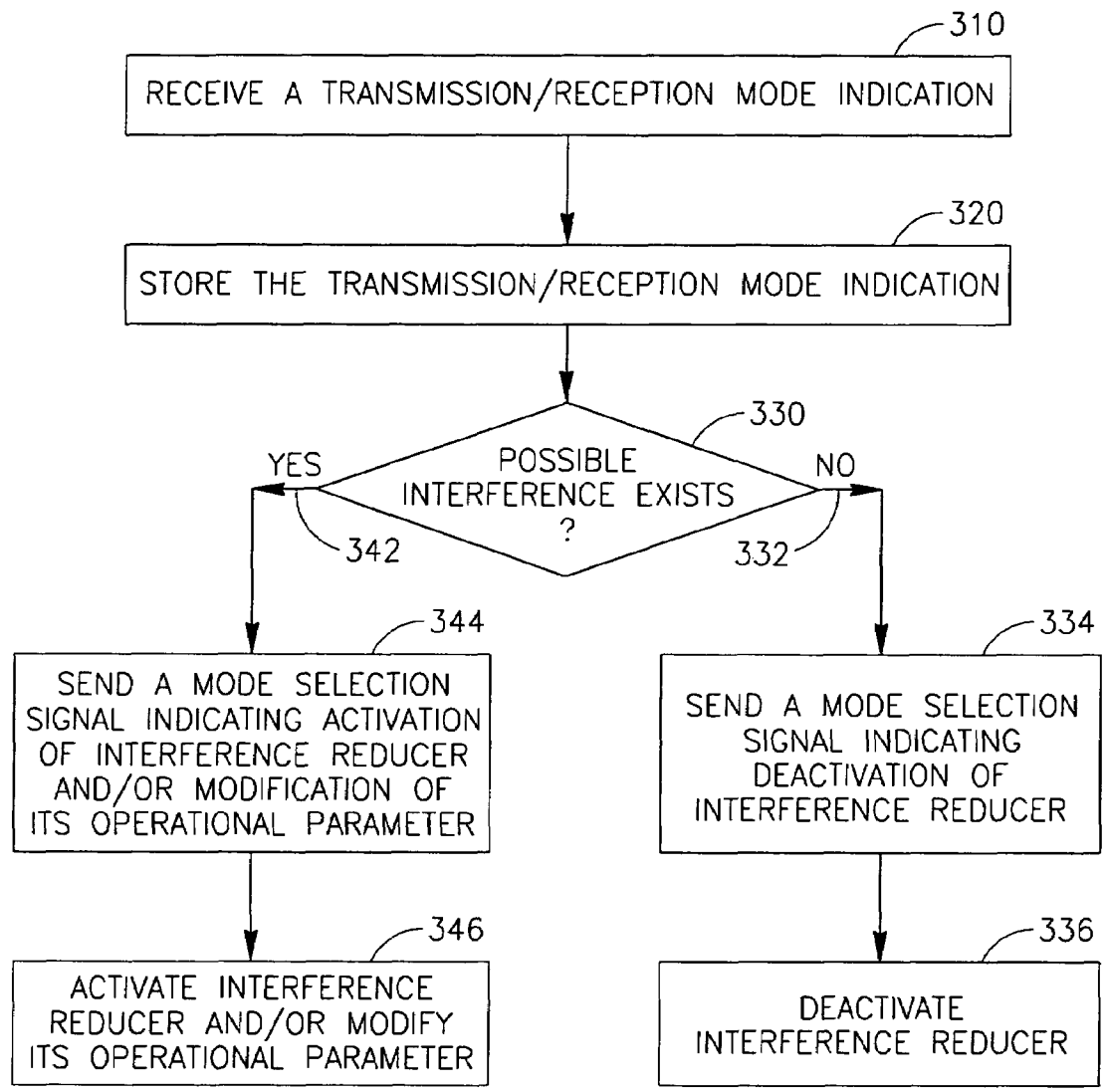
FIG. 3 is a schematic flow-chart of a method of selecting transmission modes of multiple transceivers in accordance with an embodiment of the invention.

FIG. 3 is a schematic flow-chart of a method of selecting transmission modes of multiple transceivers in accordance with an embodiment of the invention. Operations of the method may be implemented, for example, by one or devices or components of system 100 of FIG. 1 and/or system 200 of FIG. 2, for example, by station 101, by access point 131, by IRC 123, or by other suitable stations, access points, controllers, modems, processors, units, devices, and/or systems.

As indicated at box 310, the method may include, for example, receiving a first transmission/reception mode indication, e.g., from transceiver 141 of FIG. 1. The first transmission/reception mode indication may be received by, for example, IRC 123 of FIG. 1.

As indicated at box 320, the method may include, for example, storing the first transmission/reception mode indication, e.g., in mode list 124 of FIG. 1. This may include, for example, updating or modifying in the mode list 124 a prior transmission/reception mode indication received from transceiver 141 or associated with transceiver 141.

As indicated at box 330, the method may include, for example, checking whether interference is expected between transmission or reception of wireless signals using the transmission/reception mode indicated by the first transmission/reception mode indication, and transmission(s) or reception(s) of wireless signals using other transmission/reception mode(s) whose indications are stored in the mode list 124. This may be performed, for example, using a pre-defined lookup table 125 linking various transmission/reception mode combinations with corresponding intended transmission/reception modes. For example, entries in the lookup table 125 may indicate whether or not interference is expected between transmission/reception of various combinations of multiple communications standards and/or protocols.

As indicated by arrow 332, if the checking result is negative, then, as indicated at box 234, the method may include, for example, sending a mode selection signal to transceiver 141, indicating that transceiver 141 is not required to activate its interference reducer 151, or is required or instructed to deactivate its interference reducer 151. Upon receiving the mode selection signal, as indicated at box 336, the transceiver 141 may deactivate its interference reducer 151, and may transmit or receive in accordance with the standard or protocol indicated in the first transmission/reception mode indication.

Conversely, as indicated by arrow 342 and box 344, the method may include, for example, sending one or more mode selection signals to the transceiver 141 and/or to other transceivers, e.g., transceivers 142 and/or 143, indicating a requirement or instruction to activate one or more interference reducers 151-153, or a requirement or instruction to modify or set an operational parameter or property, e.g., power or voltage level, of one or more interference reducers 151-153. Upon receiving the mode selection signal(s), as indicated at box 346, the transceiver 141 and/or the other transceivers 142-143 may activate one or more interference reducers 151-153, or may modify or set the operational parameter of one or more interference reducers 151-153, and may transmit or receive wireless signals in accordance with the standard or protocol indicated in the first transmission/reception mode indication.

One or more of the above operations may be performed and/or repeated, e.g., upon activation of a transceiver, upon deactivation of a transceiver, upon modification of transmission/reception mode of a transceiver, or the like.

Other suitable operations or sets of operations may be used in accordance with embodiments of the invention.

Although portions of the discussion herein may relate, for demonstrative purposes, to selectively activating and/or deactivating of one or more interference reducers, embodiments of the invention are not limited in this regard, and may include, for example, modifying or setting an operational status of interference reducer(s), modifying or setting an operational parameter of interference reducer(s), turning on interference reducer(s), turning off interference reducer(s), bringing interference reducer(s) into or out of a stand-by mode, bringing interference reducer(s) into or out of a "sleep" mode, bringing interference reducer(s) into or out of a power-saving mode or a reduced power mode, or the like.

Although portions of the discussion herein may relate, for demonstrative purposes, to communication between an IRC and one or more transceivers, embodiments of the invention are not limited in this regard, and may include, for example, communications between an IRC and one or more transmitters, one or more receivers, one or more interference reducers, or the like. For example, in one embodiment, a mode selection signal may be sent by an IRC, e.g., directly, to an interference reducer, in addition to or instead of a transceiver.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by system 200 of FIG. 2, by station 101 of FIG. 1, by access point 131 of FIG. 2, by processor 111 of FIG. 1, by IRC 123 of FIGS. 1 and 2, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, COBOL, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
 determining from a stored prior transmission/reception indication from a first wireless transceiver of a wireless communication station whether interference is expected between an intended activity of a second wireless transceiver of a said wireless communication station and an activity of the first wireless transceiver of said wireless communication station; and
 based on the determination result, modifying an operational parameter of an interference reducer of said wireless communication station;
 wherein determining comprises determining whether interference is expected based on an entry in a lookup table indicating whether a first signal transmitted in accordance with a first wireless communication standard is expected to interfere with a second signal transmitted in accordance with a second wireless communication standard.

2. The method of claim 1, wherein determining comprises:
 determining whether interference is expected based on one or more activity mode indications received from said first and second wireless transceivers.

3. The method of claim 1, wherein modifying comprises:
 deactivating said interference reducer if the determination result is that interference is not expected.

4. The method of claim 1, wherein modifying comprises:
 activating said interference reducer if to determination result is that interference is expected.

5. The method of claim 1, wherein modifying comprises:
 modifying an operational voltage of said interference reducer if the determination result is that interference is expected.

6. The method of claim 1, further comprising:
 sending a signal to at least one of said first and second wireless transceivers indicating an instruction to modify said operational parameter of said interference reducer.

7. An apparatus comprising:
 a controller to determine from a stored prior transmission reception indication from a first wireless transceiver of a wireless communication station whether interference is expected between an intended activity of a second wireless transceiver of a said wireless communication station and an activity of the first wireless transceiver of said wireless communication station, and, based on the determination result, to modify an operational parameter of an interference reducer of said wireless communication station; and
 wherein said controller is to determine whether interference is expected based on an entry in a lookup table indicating whether a first signal transmitted in accordance with a first wireless communication standard is expected to interfere with a second signal transmitted in accordance with a second wireless communication standard.

8. The apparatus of claim 7, wherein said controller is to determine whether interference is expected based on one or more activity mode indications received from said first and second wireless transceivers.

9. The apparatus of claim 7, wherein said controller is to deactivate said interference reducer if the determination result is that interference is not expected.

10. The apparatus of claim 7, wherein said controller is to activate said interference reducer if the determination result is that interference is expected.

11. The apparatus of claim 7, wherein said controller is to modify an operational voltage of said interference reducer if the determination result is that interference is expected.

12. The apparatus of claim 7, wherein said controller is to send a signal to at least one of said first and second wireless transceivers indicating an instruction to modify said operational parameter of said interference reducer.

13. The apparatus of claim 7, wherein said interference reducer comprises an adaptive bias Voltage Controlled Oscillator.

14. A wireless communication station comprising:

the apparatus of claim 7; and an antenna to send and receive wireless communication signals.

15. A wireless communication system comprising:

a wireless communication station having a controller to determine from a stored prior transmission/reception indication from a first wireless transceiver of said wireless communication station whether interference is expected between an intended activity of a second wireless transceiver of a said wireless communication station and an activity of the first wireless transceiver of said wireless communication station, and, based on the determination result, to modify an operational parameter of an interference reducer of said wireless communication station; and wherein said controller is to determine whether interference is expected based on an entry in a lookup table indicating whether a first signal transmitted in accordance with a first wireless communication standard is expected to interfere with a second signal transmitted in accordance with a second wireless communication standard.

16. The wireless communication system of claim 15, wherein said controller is to determine whether interference is expected based on one or more activity mode indications received from said first and second wireless transceivers.

17. The wireless communication system of claim 15, wherein said controller is to deactivate said interference reducer if the determination result is that interference is not expected.

18. The wireless communication system of claim 15, wherein said controller is to activate said interference reducer if the determination result is that interference is expected.

19. The wireless communication system of claim 15, wherein said controller is to modify an operational voltage of said interference reducer if the determination result is that interference is expected.

20. The wireless communication system of claim 15, wherein said controller is to send a signal to at least one of said first and second wireless transceivers indicating an instruction to modify said operational parameter of said interference reducer.

\* \* \* \* \*